United States Patent
Lu et al.

(10) Patent No.: US 8,447,228 B2
(45) Date of Patent: May 21, 2013

(54) POWER DISTRIBUTION APPARATUS, POWER DISTRIBUTION METHOD, AND NON-INSTANT COMPUTER READABLE MEDIUM THEREOF

(75) Inventors: Shih-Jung Lu, Kaohsiung (TW); Chun-Jung Wu, Tainan (TW); David W. Lin, Hsinchu (TW); Chun-Che Chien, Taipei (TW)

(73) Assignee: Institute for Information Industry, Taipei (TW)

( * ) Notice: Subject to any disclaimer, the term of this patent is extended or adjusted under 35 U.S.C. 154(b) by 390 days.

(21) Appl. No.: 12/915,451

(22) Filed: Oct. 29, 2010

(65) Prior Publication Data
US 2012/0034864 A1   Feb. 9, 2012

(30) Foreign Application Priority Data
Aug. 3, 2010 (TW) ................ 99125721 A (51) Int. Cl.
*H04B 3/36* (2006.01)
(52) U.S. Cl.
USPC ......... 455/7; 455/8; 455/9; 455/10; 455/11.1; 455/12.1; 370/315; 370/316; 370/317; 370/318; 370/319

(58) Field of Classification Search
USPC ............ 455/7–25, 522, 69–70; 370/315–320
See application file for complete search history.

(56) References Cited

U.S. PATENT DOCUMENTS

| 8,150,409 B2 * | 4/2012 | Kim et al. | 455/452.2 |
| 2011/0199956 A1 * | 8/2011 | Wu | 370/315 |

* cited by examiner

*Primary Examiner* — Fayyaz Alam
(74) *Attorney, Agent, or Firm* — Skaar Ulbrich Macari, P.A.

(57) ABSTRACT

A power distribution apparatus (PDA), a power distribution method, and a non-instant computer readable medium thereof are provided. The PDA is used in a relay transmission system (RTS) comprising a mobile station (MS), a relay station (RS) and a base station (BS). The MS communicates with the BS through the RS. The PDA may communicate with the MS, BS and RS. The PDA computes optimum transmission parameters of the MS and BS and an optimum relay forward parameter of the RS according to a power threshold, transmission information of the RTS, an optimum condition and an algorithm. Accordingly, the MS, RS and BS may determine the optimum transmission power of the MS, RS and BS according to the optimum transmission parameters and the optimum relay forward parameter respectively.

21 Claims, 4 Drawing Sheets

POWER DISTRIBUTION APPARATUS, POWER DISTRIBUTION METHOD, AND NON-INSTANT COMPUTER READABLE MEDIUM THEREOF

PRIORITY

This application claims the benefits of priority based on Taiwan Patent Application No. 099125721 filed on Aug. 3, 2010, which is hereby incorporated by reference in its entirety.

FIELD

The present invention provides a power distribution apparatus (PDA), a power distribution method and a non-instant computer readable medium thereof. More particularly, the present invention provides a PDA, a power distribution method and a non-instant computer readable medium thereof for optimizing the power distribution of a relay transmission system (RTS).

BACKGROUND

With the rapid development of wireless communication systems and the widespread use of various mobile terminal products, there is an increasing demand for higher transmission rates in wireless communication systems. As a result, the transmission power is significantly increased. Therefore, to avoid an excessive amount of transmission power, a relay transmission system (RTS) has been adopted in the deployment and design of wireless communication systems; i.e., a relay station (RS) is added between a source station and a destination station to assist in transmission. Accordingly, more attention is being paid to control the power of the RTS.

The power design of a conventional RTS can only control the transmission power of the source station, the RS and the destination station separately, i.e., set the transmission power of the source station, the RS and the destination station separately according to their respective power limitations. As a result, an optimum power distribution cannot be achieved between the source station, the RS and the destination station under the limitation of a total transmission power, nor can an optimum transmission efficacy be achieved through the design of transmitters for the source station, the RS and the destination station.

Accordingly, it is necessary to provide a method for the power distribution of a source station, an RS and a destination station so that the optimum transmission efficacy and the optimum power distribution can be achieved in an RTS under the limitation of a transmission power.

SUMMARY

An objective of certain embodiments of the present invention is to provide a power distribution apparatus (PDA) for use in a relay transmission system (RTS). The RTS comprises a mobile station (MS), a relay station (RS) and a base station (BS). The MS communicates with the BS through the RS. The PDA is able to communicate with the MS, the RS and the BS. The PDA comprises a storage unit and a processor. The processor is electrically connected to the storage unit.

The storage unit is configured to store power threshold and transmission information of the RTS. The processor is configured to compute a total data mean square error (MSE) according to the transmission information and compute a first optimum transmission parameter, a second optimum transmission parameter and an optimum relay forward parameter according to the power threshold, total data MSE, algorithm and optimum condition for minimizing the total data MSE so that the MS determines an optimum MS transmission power according to the first optimum transmission parameter, the RS determines an optimum RS transmission power according to the optimum relay forward parameter, and the BS determines an optimum BS transmission power according to the second optimum transmission parameter.

Another objective of certain embodiments of the present invention is to provide a power distribution method for use in the aforesaid PDA. The PDA is adapted for an RTS, while the RTS comprises an MS, an RS and a BS. The MS communicates with the BS through the RS. The PDA is able to communicate with the MS, the RS and the BS. The PDA comprises a storage unit and a processor. The processor is electrically connected to the storage unit. The storage unit stores power threshold and transmission information of the RTS.

The power distribution method comprises the following steps: (a) enabling the processor to compute a total data MSE according the transmission information; and (b) enabling the processor to compute a first optimum transmission parameter, second optimum transmission parameter and optimum relay forward parameter according to the power threshold, the total data MSE, algorithm and optimum condition for minimizing the total data MSE so that the MS determines an optimum MS transmission power according to the first optimum transmission parameter, the RS determines an optimum RS transmission power according to the optimum relay forward parameter and the BS determines an optimum BS transmission power according to the second optimum transmission parameter.

Yet a further objective of certain embodiments of the present invention is to provide a non-instant computer readable medium, which stores the program of a power distribution method for use in a PDA. The PDA is adapted for an RTS, while the RTS comprises an MS, an RS and a BS. The MS communicates with the BS through the RS. The PDA is able to communicate with the MS, the RS and the BS. The PDA comprises a storage unit and a processor. The processor is electrically connected to the storage unit. The storage unit stores a power threshold and transmission information of the RTS.

The program, after being loaded into the PDA, executes a code A for enabling the processor to compute a total data MSE according to the transmission information; and a code B for enabling the processor to compute a first optimum transmission parameter, a second optimum transmission parameter and an optimum relay forward parameter according to the power threshold, the total data MSE, an algorithm and an optimum condition for minimizing the total data MSE so that the MS determines an optimum MS transmission power according to the first optimum transmission parameter, the RS determines an optimum RS transmission power according to the optimum relay forward parameter and the BS determines an optimum BS transmission power according to the second optimum transmission parameter.

Certain embodiments of the present invention compute a total data MSE of the RTS according to transmission information of an RTS, and computes a first optimum transmission parameter, a second optimum transmission parameter, an optimum relay forward parameter, a first optimum receipt parameter, a second optimum receipt parameter and a data erasure parameter through an algorithm according to the total data MSE, a power threshold of the RTS and an optimum condition for minimizing the total data MSE. Thereby, an MS, an RS and a BS in the RTS can transmit signals according to the aforesaid parameters to achieve an optimum transmission efficacy in the RTS. Thus, the present invention can overcome the drawbacks of the prior art in which an optimum power distribution cannot be achieved between a source station, an RS and a destination station under the limitation of a total transmission power and that transmitters of the source station, the RS and the destination station cannot be designed to achieve the optimum transmission efficacy.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following description, the present invention will be explained with reference to example embodiments thereof. However, these example embodiments are not intended to limit the present invention to any specific environment, example, embodiment, applications or particular implementations described in these example embodiments. Therefore, the description of these example embodiments is only for the purpose of illustration rather than limitation. It should be appreciated that in the following embodiments and the attached drawings, elements unrelated to the present invention are omitted from depiction; and dimensional relationships among individual elements in the attached drawings are illustrated only for ease of understanding, but not to limit the actual scale.

Figure 1:
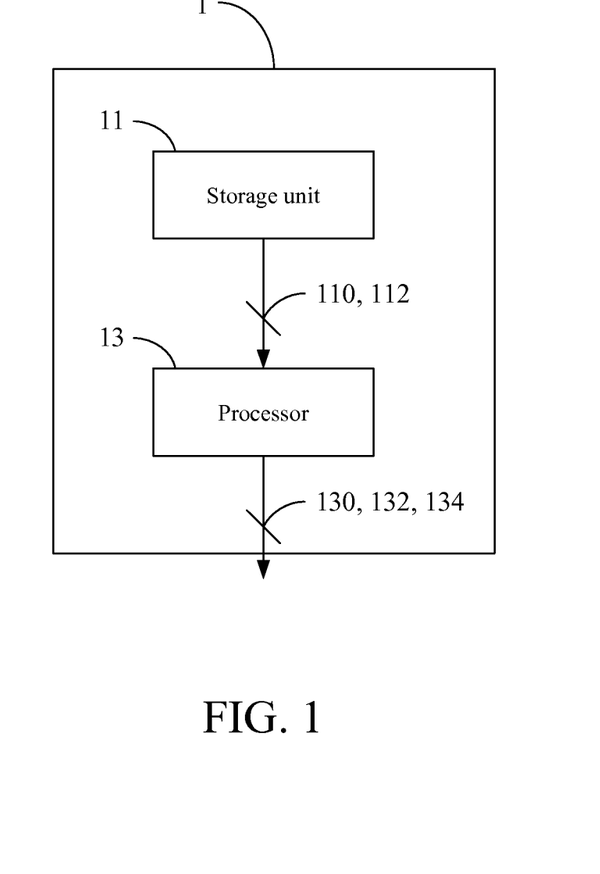
FIG. 1 is a schematic view of the first embodiment of the present invention.

The first embodiment of the present invention is a power distribution apparatus (PDA) 1, a schematic view of which is shown in FIG. 1. The PDA 1 comprises a storage unit 11 and a processor 13. The processor 13 is electrically connected to the storage unit 11. The storage unit 11 may be a memory, a floppy disk, a hard disk, a compact disk (CD), a mobile disk, a magnetic tape, a database accessible to networks, or any other storage media with the same function and well known to those of ordinary skill in the art. The processor 13 may be any various processor, central processing unit (CPU) or other device with computation functionality and well known to those of ordinary skill in the art, whether they are existing or to be developed in the future.

Figure 2:
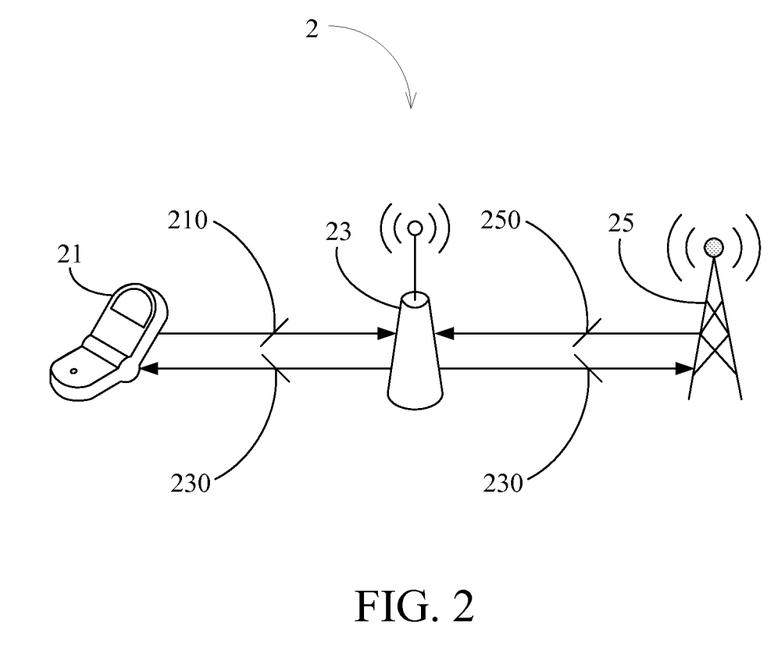
FIG. 2 is a schematic view of a relay transmission system (RTS) according to the first embodiment of the present invention.

The PDA 1 of the present invention is adapted for a relay transmission system (RTS) 2, a schematic view of which is shown in FIG. 2. The RTS 2 comprises a mobile station (MS) 21, a relay station (RS) 23 and a base station (BS) 25. The MS 21 communicates with the BS 25 through the RS 23, and the MS 21, RS 23 and BS 25 communicate with each other through a wireless transmission.

Specifically, the PDA 1 of the present invention is configured to control the power distribution of the MS 21, RS 23 and BS 25 in the RTS 2. The PDA 1 communicates, in via a wire or wireless with the MS 21, RS 23 and BS 25 respectively to transmit the power distribution result to the MS 21, RS 23 and BS 25 so that the MS 21, RS 23 and BS 25 can determine their respective power settings according to the power distribution result from the PDA 1. In this embodiment, the PDA 1 is an external apparatus; however, in other embodiments, the PDA 1 may also be an apparatus built in the MS 21, RS 23 and BS 25, and this is not intended to limit the scope of the present invention.

Hereinafter, the method in which the PDA 1 of the present invention performs the power distribution will be described in detail. First, in reference to FIGS. 1 and 2, the storage unit 11 stores the transmission information 110 of the RTS 2 and a power threshold 112 therein. The transmission information 110 comprises a first initial transmission parameter $f_{11}^{(1)}$ of the MS 21, a first initial receipt parameter $f_{11}^{(2)}$ of the MS 21, a second initial transmission parameter $f_{22}^{(1)}$ of the BS 25, a second initial receipt parameter $f_{22}^{(2)}$ of the BS 25, an initial relay forward parameter $F_R$ of the RS 23, a channel parameter $h_1$ between the MS 21 and the RS 23 (referred to as a "first channel" hereinafter) and a channel parameter $h_2$ between the RS 23 and the BS 25 (referred to as a "second channel" hereinafter), a noise parameter $n_R$ of the RS 23, a noise parameter $n_{D,1}$ of the MS 21 and a noise parameter $n_{D,2}$ of the BS 25. The channel parameter $h_1$ is a channel characteristic parameter related to the transmission environment of the first channel; the channel parameter $h_2$ is a channel characteristic parameter related to the transmission environment of the second channel; the noise parameter $n_R$ is a white Gaussian noise received by the RS 23; the noise parameter $n_{D,1}$ is a white Gaussian noise received by the MS 21; and the noise parameter $n_{D,2}$ is a white Gaussian noise received by the BS 25. The power threshold 112 comprises an MS power threshold $P_M$ and a BS total power threshold $P_{BR}$. The MS power threshold $P_M$ refers to the upper limit of an MS transmission power, and the BS total power threshold $P_{BR}$ refers to the sum of an upper limit of an RS transmission power and the upper limit of a BS transmission power.

Next, the processor 13 computes a total data mean square error (MSE) according to the transmission information 110. For ease of understanding the computation process of the total data MSE, please refer to FIG. 3, which is an architectural diagram depicting the signal processing of the RTS 2. Hereinafter, the method in which the total data MSE computed and the physical meaning it represents in the RTS 2 will be described in detail.

Figure 3:
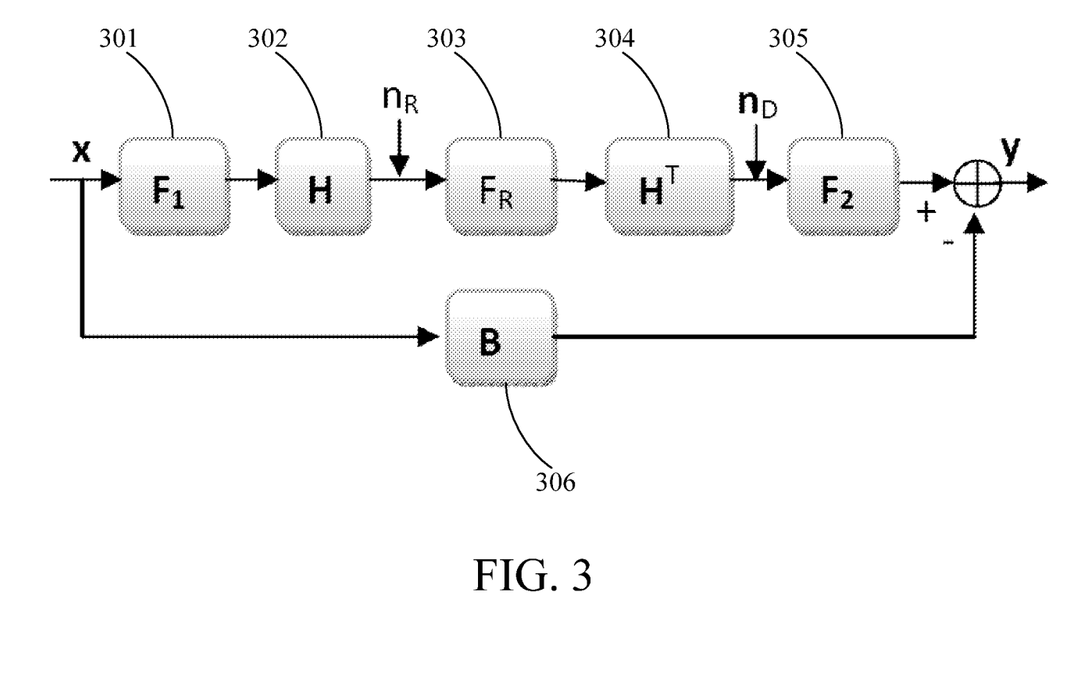
FIG. 3 is an architectural diagram depicting signal processing according to the first embodiment of the present invention.

Firstly, the MS 21 transmits an MS transmission signal 210 to the RS 23 through the first channel, while the BS 25 transmits a BS transmission signal 250 to the RS 23 through the second channel. The MS transmission signal 210 may be represented as $f_{11}^{(1)}x_1$, which represents that the first signal $x_1$ is transmitted by the MS 21, so that the first signal $x_1$ is multiplied by the first initial transmission parameter $f_{11}^{(1)}$ of the MS 21; and the BS transmission signal 250 may be represented as $f_{22}^{(1)}x_2$, which represents that a second signal $x_2$ is transmitted by the MS 21, so the second signal $x_2$ is multiplied by the second initial transmission parameter $f_{22}^{(1)}$ of the BS 25. Next, the RS 23 receives an RS receipt signal $r_{RS}$, which can be represented by the following equation (1):

$$r_{RS} = HF_1 x + n_R \quad (1)$$

$$F_1 = \begin{bmatrix} f_{11}^{(1)} & 0 \\ 0 & f_{22}^{(1)} \end{bmatrix} \quad (2)$$

where, x is a transmission signal matrix formed by the first signal $x_1$ and the second signal $x_2$, and is represented as $x=[x_1, x_2]^T$; $F_1$ is a diagonal matrix formed by the first initial transmission parameter $f_{11}^{(1)}$ and the second initial transmission parameter $f_{22}^{(1)}$, and is represented by the equation (2); and H is a channel parameter matrix formed by the channel parameter $h_1$ and the channel parameter $h_2$, and is represented as $H=[h_1 \ h_2]$. The equation (1) represents the RS 23 receiving the signals transmitted by the MS 21 and the BS 25 and takes into consideration the channel effect and noise received by the RS 23. In FIG. 3, the equation (1) represents that the signal x is multiplied by $F_1$ in the block 301, then multiplied by H in the block 302, and thereafter added with $n_R$ to obtain $r_{RS}$.

It shall be particularly appreciated that for the purpose of simplification and convenience in computation, the equations used in the present invention all perform computations in form of matrices. On the premise of conforming to the transmission characteristics of the RTS, parameter values may also be computed respectively; i.e., the parameter values may also be computed not in the form of matrices, and this is not intended to limit the scope of the present invention.

Next, the RS 23 further transmits the RS receipt signal $r_{RS}$ back to the MS 21 and the BS 25 respectively; i.e., the RS 23 transmits a relay signal 230 to the MS 21 and the BS 25 respectively. The relay signal 230 may be represented as $F_R r_{RS}$, which represents that the RS receipt signal $r_{RS}$ is transmitted by the RS 23, so the RS receipt signal $r_{RS}$ is multiplied by the initial relay forward parameter $F_R$ of the RS 23. Next, the MS 21 and the BS 25 receive an MS receipt signal $r_{MS}$ and a BS receipt signal $r_{BS}$ respectively, which can be represented by the following equation (3):

$$r_{MB} = [r_{MS} \ r_{BS}]^T = F_2 H^T F_R r_{RS} + n_D \quad (3)$$

$$F_2 = \begin{bmatrix} f_{11}^{(2)} & 0 \\ 0 & f_{22}^{(2)} \end{bmatrix} \quad (4)$$

where, $H^T$ is a transpose matrix of the channel parameter matrix H; $F_2$ is a diagonal matrix formed by the first initial receipt parameter $f_{11}^{(2)}$ and the second initial receipt parameter $f_{22}^{(2)}$, and is represented as the equation (4); and $n_D$ is a noise parameter matrix formed by the noise parameter $n_{D,1}$ and the noise parameter $n_{D,2}$. The equation (3) represents that the MS 21 and the BS 25 receive the RS receipt signal $r_{RS}$ transmitted by the RS 23 respectively and takes into consideration the channel effect and noise received by the MS 21 and the BS 25. In FIG. 3, the equation (3) represents that the RS receipt signal $r_{RS}$ is multiplied by $F_R$ in the block 303, then multiplied by $H^T$ in the block 304, added with $n_D$, and then multiplied by $F_2$ in the block 305 to obtain $r_{MS}$ and $r_{BS}$.

Since the MS receipt signal $r_{MS}$ and the BS receipt signal $r_{BS}$ are each a mixed signal comprising the first signal $x_1$ and the second signal $x_2$, the MS 21 must deduct terms related to the first signal $x_1$ from the MS receipt signal $r_{MS}$ to obtain a third signal $y_1$ related to the second signal $x_2$; and the BS 25 must deduct terms related to the second signal $x_2$ from the BS receipt signal $r_{BS}$ to obtain a fourth signal $y_2$ related to the first signal $x_1$. The third signal $y_1$ and the fourth signal $y_2$ can be represented by the following equation (5):

$$\begin{aligned} y &= [y_1 \ y_2]^T \\ &= F_2 H^T F_R r_{RS} + n_D - Bx \\ &= (F_2 H^T F_R H F_1 - B)x + F_2 H^T F_R n_R + n_D \end{aligned} \quad (5)$$

where, y is a receipt signal matrix formed by the third signal $y_1$ of the MS 21 and the fourth signal $y_2$ of the BS 25, and is represented as $y=[y_1 \ y_2]^T$; and B is a data erasure matrix. The equation (5) illustrates the retrieval of a signal component related to the second signal $x_2$ transmitted by the BS 25 from the MS receipt signal $r_{MS}$, the MS 21 must deduct from the MS receipt signal $r_{MS}$ a signal component of the first signal $x_1$ that is transmitted by the MS 21 and received by the RS 23 through the first channel and then is transmitted by the RS 23 and received by the MS 21 though the first channel. Similarly, to retrieve a signal component related to the first signal $x_1$ transmitted by the MS 21 from the BS receipt signal $r_{BS}$, the BS 25 must deduct from the BS receipt signal $r_{BS}$ a signal component of the second signal $x_2$ that is transmitted by the BS 25 and received by the RS 23 through the second channel and then is transmitted by the RS 23 and received by the BS 25 through the second channel. In FIG. 3, the equation (5) represents that the receipt signal matrix y is obtained by subtracting the data erasure matrix B of the block 306 from the receipt signal matrix $r_{MB}$ of the MS 21 and the BS 25.

As can be known from the above description, the terms related to the first signal $X_1$ must be deducted from the MS receipt signal $r_{MS}$, and the terms related to the second signal $x_2$ must be deducted from the BS receipt signal $r_{BS}$; and in computation, this is accomplished by deducting the transmission signal matrix x multiplied by the data erasure matrix B from the MS receipt signal $r_{MS}$ and the BS receipt signal $r_{BS}$. The data erasure matrix B is a diagonal matrix formed by an MS data erasure parameter $b_{11}$ and a BS data erasure parameter $b_{22}$, and can be represented by the following equation (6):

$$B = \begin{bmatrix} b_{11} & 0 \\ 0 & b_{22} \end{bmatrix} = \begin{bmatrix} f_{11}^{(2)} F_R h_1^2 f_{11}^{(1)} & 0 \\ 0 & f_{22}^{(2)} F_R h_2^2 f_{22}^{(1)} \end{bmatrix} \quad (6)$$

where, the data erasure parameter $b_{11}$ is a parameter that considers the transmission characteristic effect generated by a signal that is transmitted by the MS 21 to the RS 23 through the first channel and then by the RS 23 back to the MS 21 through the first channel, and thus can be represented as $b_{11}=f_{11}^{(2)} F_R h_1^2 f_{11}^{(1)}$; similarly, the data erasure parameter $b_{22}$ is a parameter that considers the transmission characteristic effect generated by a signal that is transmitted by the BS 25 to the RS 23 through the second channel and then is transmitted by the RS 23 back to the BS 25 through the second channel, and thus can be represented as $b_{22}=f_{22}^{(2)} F_R h_2^2 f_{22}^{(1)}$.

After computing the receipt signal matrix y, the processor 13 then computes a data error e, which is represented by the following equation (7):

$$e = \begin{bmatrix} e_1 \\ e_2 \end{bmatrix} \quad (7)$$

-continued $$= y - \begin{bmatrix} x_2 \\ x_1 \end{bmatrix}$$

$$= \begin{bmatrix} F_R h_1 h_2 f_{22}^{(1)} + F_R h_1 n_R + n_{D,1} & 0 \\ 0 & F_R h_1 h_2 f_{11}^{(1)} + F_R h_2 n_R + n_{D,2} \end{bmatrix}$$

$$\begin{bmatrix} f_{11}^{(2)} \\ f_{22}^{(2)} \end{bmatrix} - \begin{bmatrix} x_2 \\ x_1 \end{bmatrix}$$

Next, the processor 13 takes the absolute square values of $e_1$ and $e_2$, and computes their expected values to obtain a total data MSE, as shown by the following equation (8):

$$E[|e_1|^2] + E[|e_2|^2] = \begin{bmatrix} \left( \begin{array}{c} |F_R h_1 h_2 f_{22}^{(1)}|^2 \sigma_{x_2}^2 + \\ |F_R h_1|^2 \cdot \sigma_{n_R}^2 + \sigma_{n_{D,1}}^2 \end{array} \right) |f_{11}^{(2)}|^2 - \\ 2\mathrm{Re}\{F_R h_1 h_2 f_{22}^{(1)} \sigma_{x_2}^2 f_{11}^{(2)}\} + \sigma_{x_2}^2 \end{bmatrix} + \qquad (8)$$

$$\begin{bmatrix} \left( \begin{array}{c} |F_R h_1 h_2 f_{11}^{(1)}|^2 \sigma_{x_1}^2 + \\ |F_R h_2|^2 \cdot \sigma_{n_R}^2 + \sigma_{n_{D,2}}^2 \end{array} \right) |f_{22}^{(2)}|^2 - \\ 2\mathrm{Re}\{F_R h_1 h_2 f_{11}^{(1)} \sigma_{x_1}^2 f_{22}^{(2)}\} + \sigma_{x_1}^2 \end{bmatrix}$$

where, $\sigma_{x_1}^2$ a value obtained by taking the covariance of the first signal $x_1$, i.e., $E[|x_1|^2] = \sigma_{x_1}^2$; $\sigma_{x_2}^2$ is a value obtained by taking the covariance of the second signal $x_2$, i.e., $E[|x_2|^2] = \sigma_{x_2}^2$; $\sigma_{n_R}^2$ is a value obtained by taking the covariance of the noise parameter $n_R$, i.e., $E[|n_R|^2] = \sigma_{n_R}^2$; $\sigma_{n_{D,1}}^2$ is a value obtained by taking the covariance of the noise parameter $n_{D,1}$, i.e., $E[|n_{D,1}|^2] = \sigma_{n_{D,1}}^2$; and $\sigma_{n_{D,2}}^2$ is a value obtained by taking the covariance of the noise parameter $n_{D,2}$, i.e., $E[|n_{D,2}|^2] = \sigma_{n_{D,2}}^2$.

After computing the total data MSE, the processor 13 can compute the optimum transmission power values of the MS 21, RS 23 and BS 25 according to the MS power threshold $P_M$ and the BS total power threshold $P_{BR}$. The optimum transmission power values of the MS 21, RS 23 and BS 25 are transmission power values of the MS 21, RS 23 and BS 25 that enable the RTS 2 to achieve an optimum transmission efficacy. The evaluation of the transmission efficacy of an RTS is based on the value of the total data MSE as a criterion. Generally, a smaller total data MSE value corresponds to a small transmission data error of the RTS and, thus, a better transmission efficacy. Therefore, when the total data MSE has a smallest value, the optimum transmission power can be obtained correspondingly.

Accordingly, to compute the optimum transmission power values of the MS 21, RS 23 and BS 25, an optimum condition for minimizing the total data MSE (i.e., an optimum condition for minimizing the value of the equation (8)) must be met. In reference back to the equation (8), as can be known from the relational expression of the equation (8), to minimize the value of $E[|e_1|^2] + E[|e_2|^2]$, the real terms subtracted from the terms $E[|e_1|^2]$ and $E[|e_2|^2]$ respectively must be the largest; i.e., $\mathrm{Re}\{F_R h_1 h_2 f_{22}^{(1)} \sigma_{x_2}^2 f_{11}^{(2)}\}$ and $\mathrm{Re}\{F_R h_1 h_2 f_{11}^{(1)} \sigma_{x_1}^2 f_{22}^{(2)}\}$ must be the largest. According to this condition, the first optimum receipt parameter and second optimum receipt parameter when the optimum condition for minimizing the total data MSE is met can be derived as represented by the following equation (9) and equation (10) respectively:

$$f_{11,opt}^{(2)} = \frac{(F_R h_1 h_2 f_{22}^{(1)})^* \sigma_{x_2}^2}{(|F_R h_1 h_2 f_{22}^{(1)}|^2 \cdot \sigma_{x_2}^2 + |F_R h_1|^2 \cdot \sigma_{n_R}^2 + \sigma_{n_{D,1}}^2)} \qquad (9)$$

$$f_{22,opt}^{(2)} = \frac{(F_R h_1 h_2 f_{11}^{(1)})^* \sigma_{x_1}^2}{(|F_R h_1 h_2 f_{11}^{(1)}|^2 \cdot \sigma_{x_1}^2 + |F_R h_2|^2 \cdot \sigma_{n_R}^2 + \sigma_{n_{D,2}}^2)} \qquad (10)$$

where, the conjugate complexes of the numerators of the equation (9) and the equation (10), must be taken from the items $(F_R h_1 h_2 f_{22}^{(1)})$ and $(F_R h_1 h_2 f_{11}^{(1)})$ respectively to eliminate a signal phase deflection effect generated during signal transmission to avoid power loss caused by the signal phase deflection.

After the first optimum receipt parameter and the second optimum receipt parameter which meet the optimum condition are computed, the equation (9) and the equation (10) can be substituted into the equation (8) to obtain a simplified optimum objective expression, as shown by the following equation (11):

$$\min(E[|e_1|^2] + E[|e_2|^2]) = \qquad (11)$$

$$\min \left\{ \frac{|F_R h_1|^2 \cdot \sigma_{n_R}^2 + \sigma_{n_{D,1}}^2}{(|F_R h_1 h_2 f_{22}^{(1)}|^2 \cdot \sigma_{x_2}^2 + |F_R h_1|^2 \cdot \sigma_{n_R}^2 + \sigma_{n_{D,1}}^2)} \sigma_{x_2}^2 + \frac{|F_R h_2|^2 \cdot \sigma_{n_R}^2 + \sigma_{n_{D,2}}^2}{(|F_R h_1 h_2 f_{11}^{(1)}|^2 \cdot \sigma_{x_1}^2 + |F_R h_2|^2 \cdot \sigma_{n_R}^2 + \sigma_{n_{D,2}}^2)} \sigma_{x_1}^2 \right\}$$

$$|f_{11}^{(1)}|^2 \le P_M, |f_{22}^{(1)}|^2 + |F_R|^2 \le P_{BR} \qquad (12)$$

Finally, the processor 13 can compute the optimum transmission power $|f_{11}^{(1)}|^2$ of the MS 21, the optimum transmission power $|F_R|^2$ of the RS 23 and the optimum transmission power $|f_{22}^{(1)}|^2$ of the BS 25 through an algorithm according to the equation (11) and a conditional expression (12). The conditional expression (12) imposes limits on the MS power and the BS total power.

For example, the processor 13 can compute the optimum transmission power $|f_{11}^{(1)}|^2 = P_M$ of the MS 21 according to the equation (11) and the conditional expression (12). Next, for the optimum transmission power of the RS 23 and the optimum transmission power of the BS 25, since the equation (11), after being differentiated with respect to $|F_R|^2$, becomes a higher-order equation and has no simple closed-form optimum solution, a search algorithm or an optimization algorithm (e.g., a dichotomy method, a Newton method or the like) may be used to solve this equation. Using the dichotomy method, an appropriate initial value must be set first to improve the searching efficiency. In this embodiment, the value of the first term in the equation (11) differentiated with respect to $|F_R|^2$ may be set to 0, thus the transmission power values of the RS 23 and the BS 25 can be obtained as shown by the following equation (13) and equation (14) respectively:

$$|F_R|^2 = \frac{-\sigma_{n_D}^2 + \sqrt{\sigma_{n_D}^4 + |h_1|^2 \sigma_{n_R}^2 \sigma_{n_D}^2 P_{BR}}}{|h_1|^2 \sigma_{n_R}^2} \qquad (13)$$

-continued $$|f_{22}^{(1)}|^2 = \frac{|h_1|^2\sigma_{n_R}^2 P_{BR} + \sigma_{n_D}^2 - \sqrt{\sigma_{n_D}^4 + |h_1|^2\sigma_{n_R}^2\sigma_{n_D}^2 P_{BR}}}{|h_1|^2\sigma_{n_R}^2} \quad (14)$$

Because the equation (13) and the equation (14) are solutions obtained by considering only the first term of the equation (11), they are sub-optimum solutions. As can be known from the second term in the equation (11), the higher transmission power of the RS 23, the smaller the value of the second term. Therefore, it can be known that the optimum RS transmission power is between the sub-optimum solution obtained from the equation (13) and $P_{BR}$. Therefore, these two values are further set as initial values of the dichotomy method instead as shown by the following equation (15):

$$|F_R|^2_{(Low,0)} = \frac{-\sigma_{n_D}^2 + \sqrt{\sigma_{n_D}^4 + |h_1|^2\sigma_{n_R}^2\sigma_{n_D}^2 P_{BR}}}{|h_1|^2\sigma_{n_R}^2} \quad (15)$$

$$|F_R|^2_{(Upper,0)} = P_{BR}$$

$$|F_R|^2_{(Mid,0)} = (|F_R|^2_{(Low,0)} + |F_R|^2_{(Upper,0)})/2$$

Next, an optimum solution of the RS transmission power can be obtained through recursive computations according to the dichotomy method, and the recursive computing process of the dichotomy method is as shown by the following equation (16):

$$|F_R|^2_{(TempLow,n-1)} = (|F_R|^2_{(Low,n-1)} + |F_R|^2_{(Mid,n-1)})/2$$

and $|F_R|^2_{(TempUpper,n-1)} = (|F_R|^2_{(Mid,n-1)} + |F_R|^2_{(Upper,n-1)})/2$ if $MSE_{(TempLow,n-1)} < MSE_{(TempUpper,n-1)}$, then $|F_R|^2_{(Low,n)} = |F_R|^2_{(Low,n-1)}, |F_R|^2_{(Upper,n)} = |F_R|^2_{(Mid,n-1)}$, else $|F_R|^2_{(Low,n)} = |F_R|^2_{(Mid,n-1)}, |F_R|^2_{(Upper,n)} = |F_R|^2_{(Upper,n-1)}$ $|F_R|^2_{(Mid,n)} = (|F_R|^2_{(Low,n)} + |F_R|^2_{(Upper,n)})/2 \quad (16)$ For the aforesaid dichotomy expressions, computational complexity can be adjusted flexibly according to the actual relay transmission environment and the computing speed requirement of the processor 13, and the equation (13) to the equation (16) are not intended to limit the scope of the present invention.

After the solution of the optimum RS transmission power $|F_R|_{opt}^2$ is obtained through the aforesaid search algorithm or the optimization algorithm, the processor 13 can further derive a first optimum transmission parameter of the MS 21, an optimum relay forward parameter of the RS 23 and a second optimum transmission parameter of the BS 25 respectively according to the MS power threshold $P_M$ and the BS total power threshold $P_{BR}$, as shown by the following equation (17):

$$f_{11,opt}^{(1)} = \sqrt{P_M}$$

$$F_{R,opt} = \sqrt{|F_R|_{opt}^2}$$

$$f_{22,opt}^{(1)} = \sqrt{P_{BR} - |F_R|_{opt}^2} \quad (17)$$

After computing the first optimum transmission parameter $f_{11,opt}^{(1)}$, the optimum relay forward parameter $F_{R,opt}$ and the second optimum transmission parameter $f_{22,opt}^{(1)}$, the processor 13 then computes the values of the first optimum receipt parameter $f_{11,opt}^{(2)}$ and the second optimum receipt parameter $f_{22,opt}^{(2)}$ respectively according to the equation (9) and the equation (10), and computes values of the MS data erasure parameter $b_{11}$ and the BS data erasure parameter $b_{22}$ respectively according to the equation (6).

Finally, after computing the first optimum transmission parameter $f_{11,opt}^{(1)}$, the first optimum receipt parameter $f_{11,opt}^{(2)}$, the second optimum transmission parameter $f_{22,opt}^{(1)}$, the second optimum receipt parameter $f_{22,opt}^{(2)}$, the optimum relay forward parameter $F_{R,opt}$, the MS data erasure parameter $b_{11}$ and the BS data erasure parameter $b_{22}$, the processor 13 then transmits the following information to the following components: an MS transmission/reception parameter 130 comprising the first optimum transmission parameter $f_{11,opt}^{(1)}$, the first optimum receipt parameter $f_{11,opt}^{(2)}$ and the MS data erasure parameter $b_{11}$ to the MS 21; transmits to the RS 23 an RS transmission/reception parameter 132 comprising the optimum relay forward parameter $F_{R,opt}$ transmits to the RS 23; and a BS transmission/reception parameter 134 comprising the second optimum transmission parameter $f_{22,opt}^{(1)}$, the second optimum receipt parameter $f_{22,opt}^{(2)}$ and the BS data erasure parameter $b_{22}$ transmits to the BS 25. Thereby, the MS 21, RS 23 and BS 25 can carry out signal transmission according to the MS transmission/reception parameter 130, the RS transmission/reception parameter 132 and the BS transmission/reception parameter 134 respectively so that the RTS 2 can achieve optimum transmission efficacy.

It shall be particularly appreciated that the RTS 2 may be one of a conventional RTS, an RTS adopting network coding (i.e., an RTS of separate reception and simultaneous transmission) and an RTS adopting physical layer network coding (i.e., an RTS of simultaneous reception and simultaneous transmission). The above description of the present invention is directed to the power distribution in the most complex RTS adopting physical layer network coding, so the PDA of the present invention, after being simplified appropriately, may also be adapted for the conventional RTS and the RTS adopting network coding, and this is not intended to limit the scope of the present invention. The method in which the PDA can be simplified can be readily known to those of ordinary skill in the art according to the above description of the present invention, and thus will not be further described herein.

Figure 4:
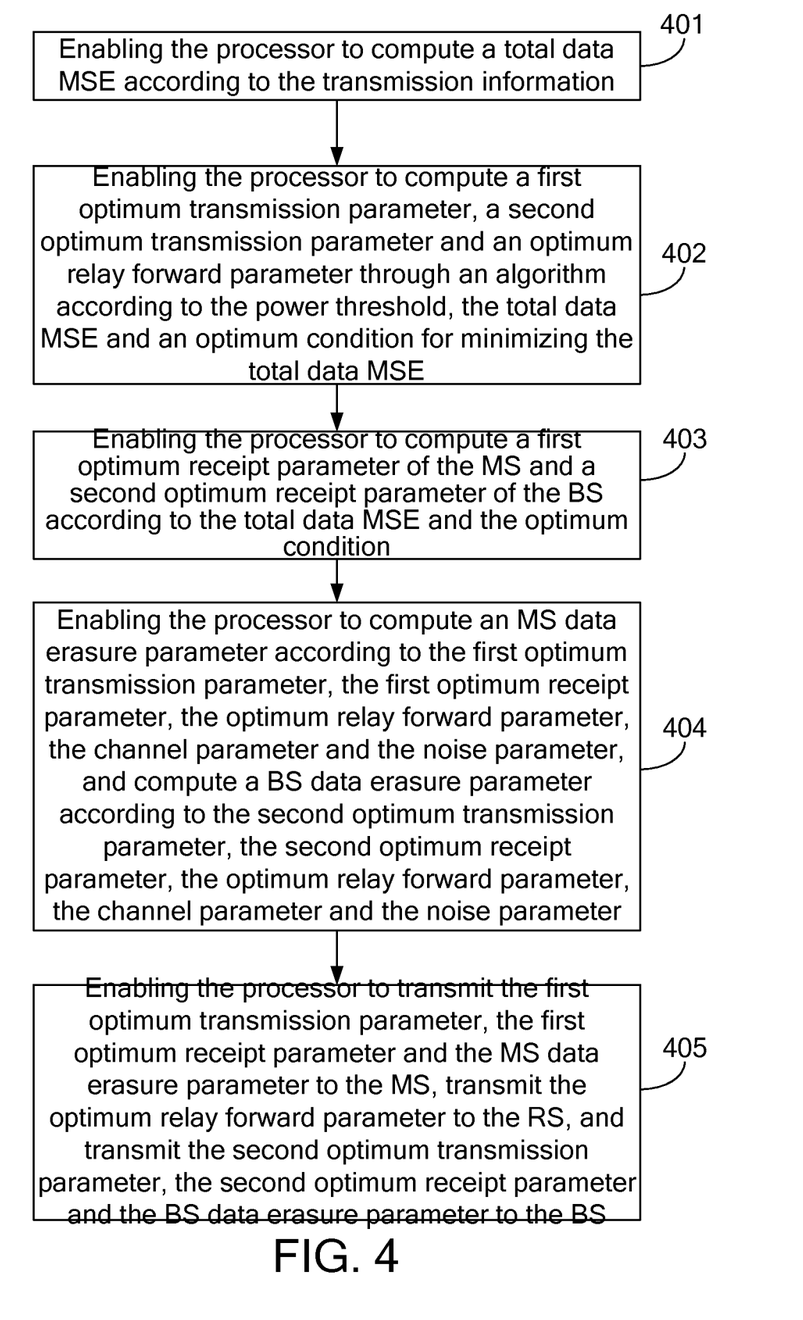
FIG. 4 is a flowchart according to the second embodiment of the present invention.

As shown in FIG. 4, the second embodiment of the present invention is a power distribution method for use in the PDA described in the first embodiment. The PDA is adapted for an RTS, and the RTS comprises an MS, RS and BS. The MS communicates with the BS through the RS, and the PDA is able to communicate with the MS, RS and BS. The PDA comprises a storage unit and a processor. The processor is electrically connected to the storage unit, while the storage unit stores a power threshold and transmission information of the RTS.

Furthermore, the power distribution method described in the second embodiment can be implemented by a computer program product. When the computer program product is loaded into the PDA via a computer and a plurality of codes comprised therein is executed, the power distribution method described in the second embodiment can be accomplished. The aforesaid computer program product may be stored in a tangible machine-readable medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

A flowchart of the power distribution method of the second embodiment is depicted in FIG. 4. First, step 401 is executed to enable the processor to compute a total data MSE according to the transmission information. Next, step 402 is executed to enable the processor to compute a first optimum transmission parameter, a second optimum transmission parameter and an optimum relay forward parameter according to the power threshold, the total data MSE, the algorithm and an optimum condition for minimizing the total data MSE.

Thereafter, step 403 is executed to enable the processor to compute a first optimum receipt parameter of the MS and a second optimum receipt parameter of the BS according to the total data MSE and the optimum condition.

Next, step 404 is executed to enable the processor to compute an MS data erasure parameter according to the first optimum transmission parameter, the first optimum receipt parameter, the optimum relay forward parameter, the channel parameter and the noise parameter, and further compute a BS data erasure parameter according to the second optimum transmission parameter, the second optimum receipt parameter, the optimum relay forward parameter, the channel parameter and the noise parameter.

Finally, step 405 is executed to enable the processor to transmit the first optimum transmission parameter, the first optimum receipt parameter and the MS data erasure parameter to the MS; transmit the optimum relay forward parameter to the RS; and transmit the second optimum transmission parameter, the second optimum receipt parameter and the BS data erasure parameter to the BS. Thereby, the MS can transmit a signal according to the first optimum transmission parameter, the first optimum receipt parameter and the MS data erasure parameter; the RS can transmit a signal according to the optimum relay forward parameter; and the BS can transmit a signal according to the second optimum transmission parameter, the second optimum receipt parameter and the BS data erasure parameter, thereby enabling the RTS to achieve the optimum transmission efficacy.

In addition to the aforesaid steps, the second embodiment can also execute all the operations and functions set forth in the first embodiment. The method in which the second embodiment executes these operations and functions will be readily appreciated by those of ordinary skill in the art based on the explanation of the first embodiment, and thus will not be further described herein.

According to the above descriptions, certain embodiments of the present invention compute a total data MSE of an RTS according to transmission information of the RTS, and compute a first optimum transmission parameter, a second optimum transmission parameter, an optimum relay forward parameter, a first optimum receipt parameter, a second optimum receipt parameter and a data erasure parameter through an algorithm according to the total data MSE, a power threshold of the RTS and an optimum condition for minimizing the total data MSE. Thereby, an MS, RS and BS in the RTS can transmit signals according to the aforesaid parameters so that the RTS can achieve an optimum transmission efficacy. Accordingly, the present invention can overcome the drawbacks of the prior art in which the optimum power distribution cannot be achieved between a source station, an RS and a destination station under the limitation of a total transmission power and that transmitters of the source station, the RS and the destination station cannot be designed to achieve optimum transmission efficacy. Moreover, the present invention has the advantages of improving the link layer transmission efficacy, reducing the mutual interference between systems and between stations to improve the network capacity, making efficient use of the system power to reduce the operation cost, reducing battery usage, and decreasing the total amount of electromagnetic waves in the environment.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A power distribution apparatus (PDA) for use in a relay transmission system (RTS), the RTS comprising a mobile station (MS), a relay station (RS) and a base station (BS), the MS communicating with the BS through the RS, the PDA being able to communicate with the MS, the RS and the BS, the PDA comprising:
a storage unit, being configured to store a power threshold and transmission information of the RTS; and
a processor, being electrically connected to the storage unit and configured to:
compute a total data mean square error (MSE) according to the transmission information; and
compute a first transmission parameter of the MS, a second transmission parameter of the BS and a relay forward parameter of the RS according to the power threshold, the total data MSE and an algorithm so that the MS determines an MS transmission power according to the first transmission parameter, the RS determines an RS transmission power according to the relay forward parameter, and the BS determines a BS transmission power according to the second transmission parameter.

2. The PDA as claimed in claim 1, wherein the transmission information comprises a first initial transmission parameter and a first initial receipt parameter of the MS, a second initial transmission parameter and a second initial receipt parameter of the BS and an initial relay forward parameter, a channel parameter and a noise parameter of the RS, and the processor is configured to compute the total data MSE according to the first initial transmission parameter, the first initial receipt parameter, the second initial transmission parameter, the second initial receipt parameter, the initial relay forward parameter, the channel parameter and the noise parameter.

3. The PDA as claimed in claim 1, wherein the power threshold comprises an MS power threshold and a BS total power threshold, and the processor is configured to:
compute the first transmission parameter according to the MS power threshold, the total data MSE and the algorithm; and
compute the second transmission parameter and the relay forward parameter according to the BS total power threshold, the total data MSE and the algorithm.

4. The PDA as claimed in claim 1, wherein the processor is further configured to compute a first optimum transmission parameter, a second optimum transmission parameter and an optimum relay forward parameter according to the power threshold, the total data MSE, the algorithm and an optimum condition for minimizing the total data MSE so that the MS determines an optimum MS transmission power according to the first optimum transmission parameter, the RS determines an optimum RS transmission power according to the optimum relay forward parameter, and the BS determines an optimum BS transmission power according to the second optimum transmission parameter.

5. The PDA as claimed in claim 4, wherein the RS is configured to transmit a relay signal to the MS and the BS respectively, and the processor is further configured to compute a first optimum receipt parameter of the MS and a second optimum receipt parameter of the BS according to the total data MSE and the optimum condition so that the MS receives the relay signal according to the first optimum receipt parameter and the BS receives the relay signal according to the second optimum receipt parameter.

6. The PDA as claimed in claim 5, wherein the MS is further configured to transmit a first signal to the RS, the BS is further configured to transmit a second signal to the RS, the relay signal is a mixed signal comprising the first signal and the second signal, the processor is further configured to compute an MS data erasure parameter according to the first optimum transmission parameter, the first optimum receipt parameter, the optimum relay forward parameter, the channel parameter and the noise parameter, and the processor is further configured to compute a BS data erasure parameter according to the second optimum transmission parameter, the second optimum receipt parameter, the optimum relay forward parameter, the channel parameter and the noise parameter so that the MS erases the first signal from the relay signal to obtain the second signal according to the MS data erasure parameter, and the BS erases the second signal from the relay signal to obtain the first signal according to the BS data erasure parameter.

7. The PDA as claimed in claim 1, wherein the algorithm is one of a search algorithm and an optimization algorithm.

8. A power distribution method for use in a PDA adapted for an RTS, the RTS comprising an MS, an RS and a BS, the MS communicating with the BS through the RS, the PDA being able to communicate with the MS, the RS and the BS, the PDA comprising a storage unit and a processor, the processor being electrically connected to the storage unit, the storage unit storing a power threshold and transmission information of the RTS, the power distribution method comprising the steps of:
(a) enabling the processor to compute a total data MSE according the transmission information; and
(b) enabling the processor to compute a first transmission parameter of the MS, a second transmission parameter of the BS and a relay forward parameter of the RS according the power threshold, the total data MSE and an algorithm so that the MS determines an MS transmission power according to the first transmission parameter, the RS determines an RS transmission power of RS according to the relay forward parameter and the BS determines a BS transmission power according to the second transmission parameter.

9. The power distribution method as claimed in claim 8, wherein the transmission information comprises a first initial transmission parameter and a first initial receipt parameter of the MS, a second initial transmission parameter and a second initial receipt parameter of the BS, and an initial relay forward parameter, a channel parameter and a noise parameter of the RS, and the step (a) is a step of computing the total data MSE according to the first initial transmission parameter, the first initial receipt parameter, the second initial transmission parameter, the second initial receipt parameter, the initial relay forward parameter, the channel parameter and the noise parameter.

10. The power distribution method as claimed in claim 8, wherein the power threshold comprises an MS power threshold and a BS total power threshold, and the step (b) comprises the steps of:
(b1) computing the first transmission parameter according to the MS power threshold, the total data MSE and the algorithm; and
(b2) computing the second transmission parameter and the relay forward parameter according to the BS total power threshold, the total data MSE and the algorithm.

11. The power distribution method as claimed in claim 8, further comprising the step of:
(c) enabling the processor to compute a first optimum transmission parameter, a second optimum transmission parameter and an optimum relay forward parameter according to the power threshold, the total data MSE, the algorithm and an optimum condition for minimizing the total data MSE so that the MS determines an optimum MS transmission power according to the first optimum transmission parameter, the RS determines an optimum RS transmission power according to the optimum relay forward parameter and the BS determines an optimum BS transmission power according to the second optimum transmission parameter.

12. The power distribution method as claimed in claim 11, wherein the RS is configured to transmit a relay signal to the MS and the BS respectively, and the power distribution method further comprises the step of:
(d) enabling the processor to compute a first optimum receipt parameter of the MS and a second optimum receipt parameter of the BS according to the total data MSE and the optimum condition so that the MS receives the relay signal according to the first optimum receipt parameter and the BS receives the relay signal according to the second optimum receipt parameter.

13. The power distribution method as claimed in claim 12, wherein the MS is further configured to transmit a first signal to the RS, the BS is further configured to transmit a second signal to the RS, the relay signal is a mixed signal comprising the first signal and the second signal, and the power distribution method further comprises the following steps of:
(e) enabling the processor to compute an MS data erasure parameter according to the first optimum transmission parameter, the first optimum receipt parameter, the optimum relay forward parameter, the channel parameter and the noise parameter; and
(f) enabling the processor to compute a BS data erasure parameter according to the second optimum transmission parameter, the second optimum receipt parameter, the optimum relay forward parameter, the channel parameter and the noise parameter so that the MS erases the first signal from the relay signal to obtain the second signal according to the MS data erasure parameter and the BS erases the second signal from the relay signal to obtain the first signal according to the BS data erasure parameter.

14. The power distribution method as claimed in claim 8, wherein the algorithm is one of a search algorithm and an optimization algorithm.

15. A non-instant computer readable medium, storing a program of a power distribution method for use in a PDA, the PDA being adapted for an RTS, the RTS comprising an MS, an RS and a BS, the MS communicating with the BS through the RS, the PDA being able to communicate with the MS, the RS and the BS, the PDA comprising a storage unit and a processor, the processor being electrically connected to the storage unit, the storage unit storing a power threshold and transmission information of the RTS, the program comprising:
  a code A for enabling the processor to compute a total data MSE according to the transmission information; and
  a code B for enabling the processor to compute a first transmission parameter of the MS, a second transmission parameter of the BS and a relay forward parameter of the RS according to the power threshold, the total data MSE and an algorithm so that the MS determines an MS transmission power according to the first transmission parameter, the RS determines an RS transmission power according to the relay forward parameter and the BS determines a BS transmission power according to the second transmission parameter.

16. The non-instant computer readable medium as claimed in claim 15, wherein the transmission information comprises a first initial transmission parameter and a first initial receipt parameter of the MS, a second initial transmission parameter and a second initial receipt parameter of the BS, and an initial relay forward parameter, a channel parameter and a noise parameter of the RS, and the code A is a code for enabling the processor to compute the total data MSE according to the first initial transmission parameter, the first initial receipt parameter, the second initial transmission parameter, the second initial receipt parameter, the initial relay forward parameter, the channel parameter and the noise parameter.

17. The non-instant computer readable medium as claimed in claim 15, wherein the power threshold comprises an MS power threshold and a BS total power threshold, and the code B comprises:
  a code B1 for enabling the processor to compute the first transmission parameter according to the MS power threshold, the total data MSE and the algorithm; and
  a code B2 for enabling the processor to compute the second transmission parameter and the relay forward parameter according to the BS total power threshold, the total data MSE and the algorithm.

18. The non-instant computer readable medium as claimed in claim 15, wherein the program further comprises:
  a code C for enabling the processor to compute a first optimum transmission parameter, a second optimum transmission parameter and an optimum relay forward parameter according to the power threshold, the total data MSE, the algorithm and an optimum condition for minimizing the total data MSE so that the MS determines an optimum MS transmission power according to the first optimum transmission parameter, the RS determines an optimum RS transmission power according to the optimum relay forward parameter and the BS determines an optimum BS transmission power according to the second optimum transmission parameter.

19. The non-instant computer readable medium as claimed in claim 18, wherein the RS is configured to transmit a relay signal to the MS and the BS respectively, and the program further comprises:
  a code D for enabling the processor to compute a first optimum receipt parameter of the MS and a second optimum receipt parameter of the BS according to the total data MSE and the optimum condition so that the MS receives the relay signal according to the first optimum receipt parameter and the BS receives the relay signal according to the second optimum receipt parameter.

20. The non-instant computer readable medium as claimed in claim 19, wherein the MS is further configured to transmit a first signal to the RS, the BS is further configured to transmit a second signal to the RS, the relay signal is a mixed signal comprising the first signal and the second signal, and the program further comprises:
  a code E for enabling the processor to compute an MS data erasure parameter according to the first optimum transmission parameter, the first optimum receipt parameter, the optimum relay forward parameter, the channel parameter and the noise parameter; and
  a code F for enabling the processor to compute a BS data erasure parameter according to the second optimum transmission parameter, the second optimum receipt parameter, the optimum relay forward parameter, the channel parameter and the noise parameter so that the MS erases the first signal from the relay signal to obtain the second signal according to the MS data erasure parameter, and the BS erases the second signal from the relay signal to obtain the first signal according to the BS data erasure parameter.

21. The non-instant computer readable medium as claimed in claim 15, wherein the algorithm is one of a search algorithm and an optimization algorithm.

* * * * *